United States Patent
Tian

(10) Patent No.: US 7,570,398 B2
(45) Date of Patent: Aug. 4, 2009

(54) SECURE SCANNING DEVICE

(75) Inventor: Lifen Tian, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 20 days.

(21) Appl. No.: 11/546,056

(22) Filed: Oct. 10, 2006

(65) Prior Publication Data
US 2008/0144127 A1    Jun. 19, 2008

(51) Int. Cl.
*H04N 1/00*    (2006.01)
(52) U.S. Cl. .................. 358/474; 358/496; 358/296
(58) Field of Classification Search ........... 713/171, 713/201; 271/298; 358/405, 474, 496, 296
See application file for complete search history.

(56) References Cited

U.S. PATENT DOCUMENTS

| | | | | |
|---|---|---|---|---|
| 4,980,719 | A * | 12/1990 | Allen et al. | 399/3 |
| 5,308,058 | A * | 5/1994 | Mandel et al. | 271/289 |
| 5,366,213 | A * | 11/1994 | Polachak et al. | 271/3.14 |
| 5,513,013 | A * | 4/1996 | Kuo | 358/448 |
| 5,587,809 | A * | 12/1996 | Le Corre et al. | 358/405 |
| 5,752,697 | A * | 5/1998 | Mandel et al. | 271/288 |
| 5,814,809 | A * | 9/1998 | Han | 358/474 |
| 6,003,135 | A * | 12/1999 | Bialick et al. | 726/29 |
| 2003/0139844 | A1 | 7/2003 | Carlson | |
| 2006/0136726 | A1 * | 6/2006 | Ragnet et al. | 713/171 |
| 2007/0090958 | A1 * | 4/2007 | Stilp | 340/572.8 |

FOREIGN PATENT DOCUMENTS

| EP | 0 241 273 A2 | 10/1987 |
|---|---|---|
| EP | 1 553 525 A2 | 7/2005 |

OTHER PUBLICATIONS

European Patent Office, "European Search Report", Foreign Application No. 07254020.6-1228, received Feb. 25, 2008, 6 pages.

* cited by examiner

*Primary Examiner*—Kimberly A Williams
(74) *Attorney, Agent, or Firm*—Hickman Palermo Truong & Becker LLP; Edward A. Becker

(57) ABSTRACT

A scanning device includes a mechanism and/or process for scanning a document and generating scan data that reflects the document. The scanning device is configured with a secure scanning mode of operation that allows scan data to be securely transmitted to one or more recipients and also controls physical access to a document. Secure scanning may be initiated manually by a user or initiated automatically based upon an identification or authentication of the user and/or one more recipients of the scan data. The scanning device may also be configured to generate and provide status data to a user that indicates the current status of a scanning operation and/or the successful delivery of scan data to one or more recipients. The device may also be configured to determine the proximity of a user with respect to the device and use the proximity information to provide various notifications.

13 Claims, 6 Drawing Sheets

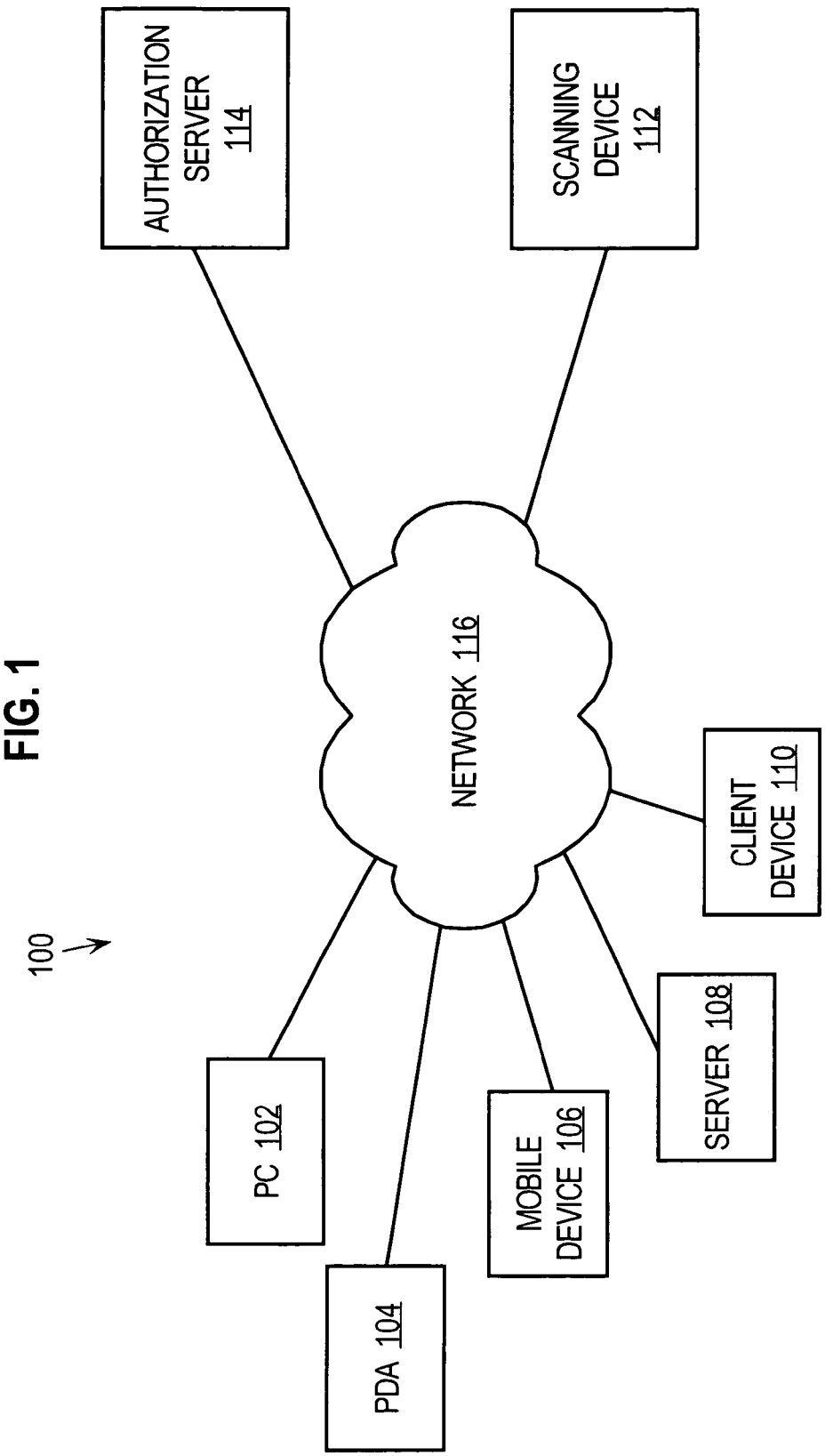

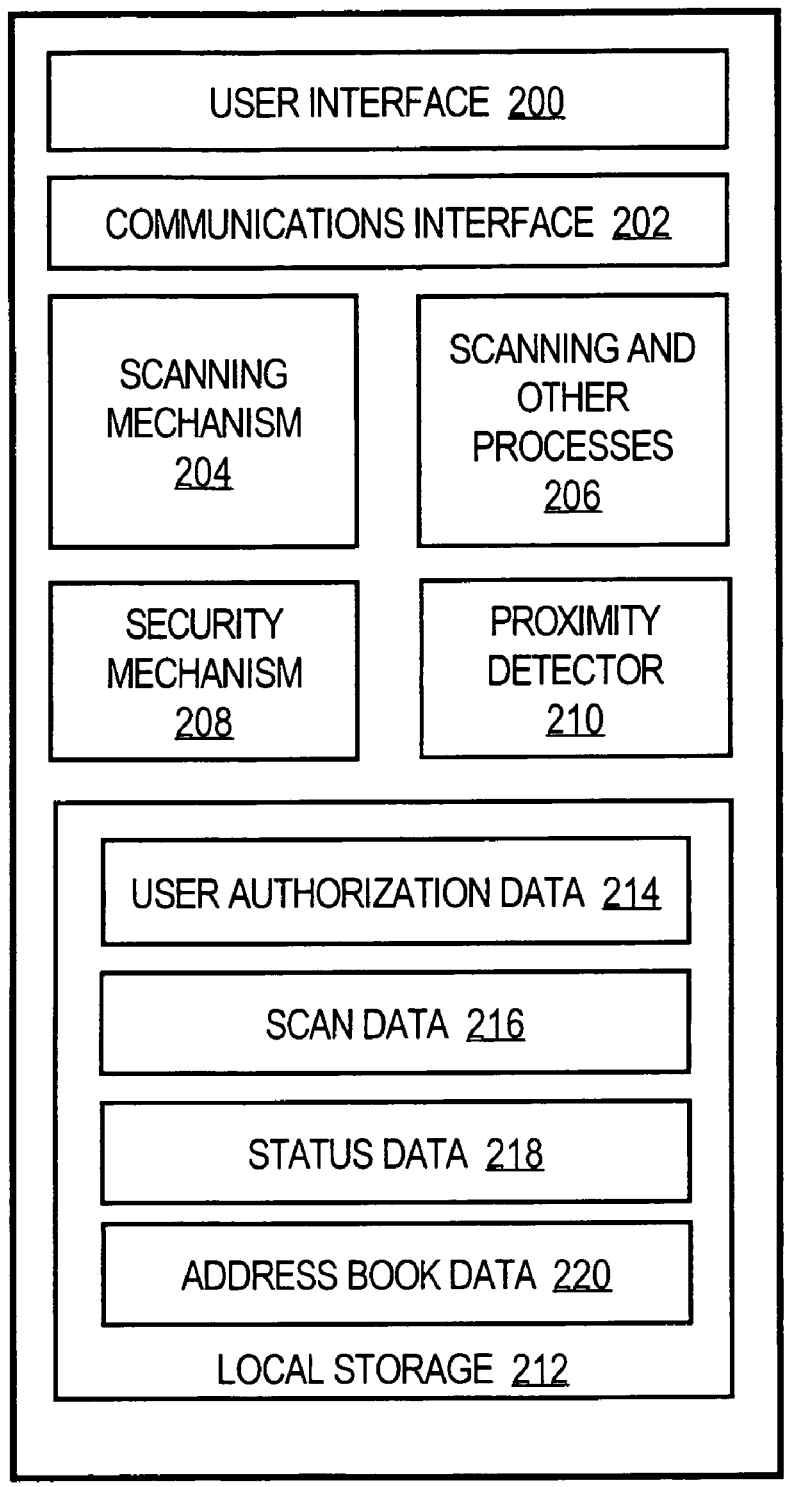

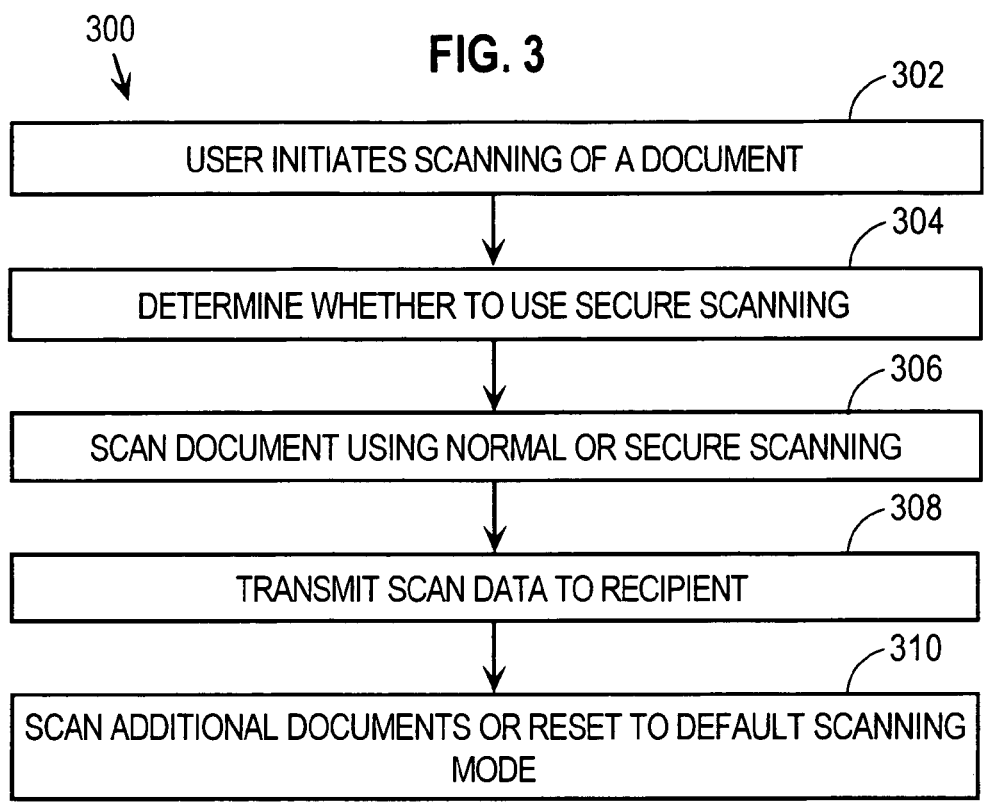

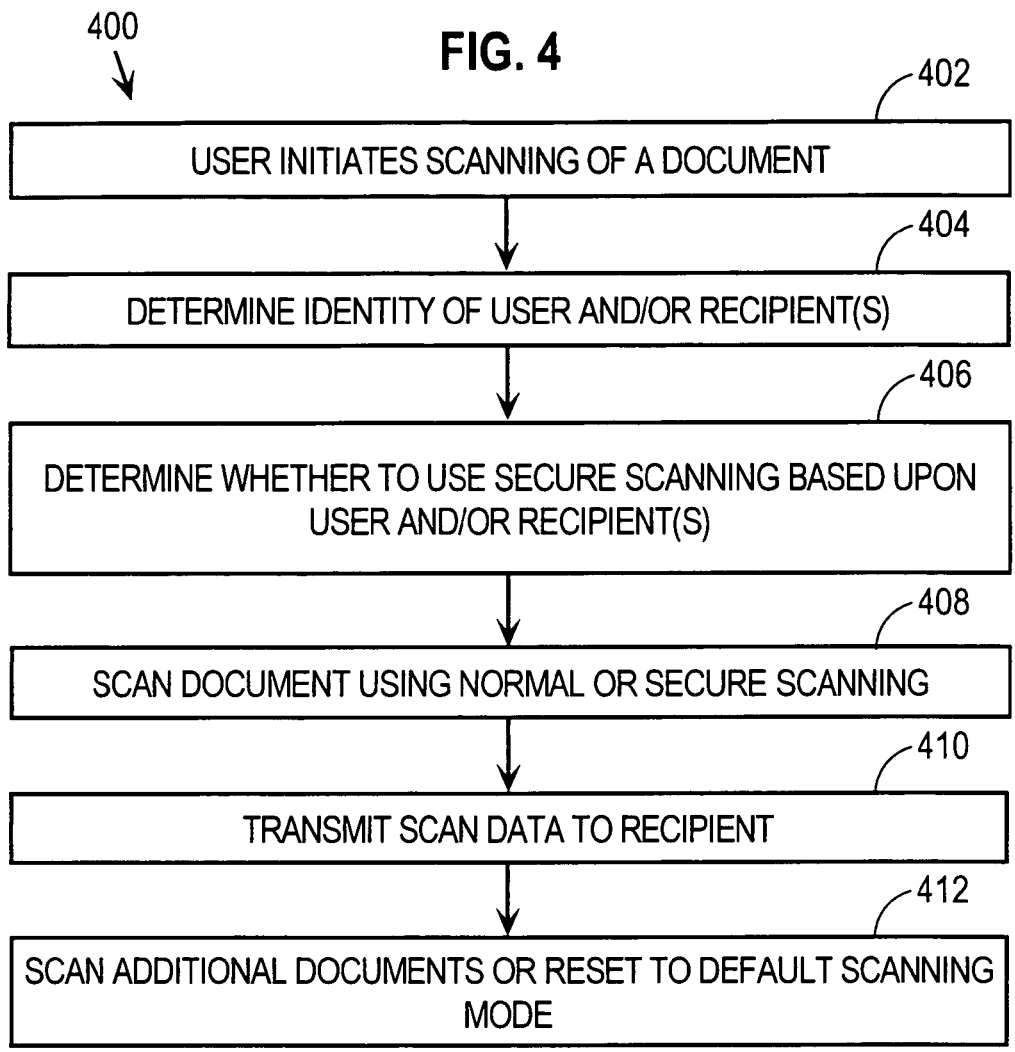

US 7,570,398 B2

SECURE SCANNING DEVICE

FIELD OF THE INVENTION

This invention relates generally to scanning devices and more specifically, to a secure scanning device.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Many types of office automation equipment and network-enabled devices, such as multi-function peripheral (MFP) devices, include scanning mechanisms. For example, some so called "all-in-one" MFPs provide copying, scanning and faxing functionality at a very affordable price. One of the limitations of scanning devices is that they do not protect the documents that have been scanned in a secure manner. Typically a document to be scanned is loaded into an Automatic Document Feeder (ADF) or placed on a flatbed. After scanning, a document in the ADF is discharged into a pickup area and a document on the flatbed remains there. In both situations, the document that was scanned is not maintained in a secure manner and can be removed by anyone having access to the scanning device. This can be problematic in situations where the documents to be scanned contain sensitive information or are confidential. In these situations, users must wait until the documents have been completely scanned, which can take a long time for documents that contain a large number of pages or are scanned at a high resolution. Based on the foregoing, there is a need for an approach for scanning documents that does not suffer from limitations of prior approaches for scanning documents.

SUMMARY

A scanning device includes a mechanism and/or process for scanning a document and generating scan data that reflects the document. The scanning device is configured with a secure scanning mode of operation. When operating in the secure scanning mode, the scanning device may securely transmit scan data to one or more recipients and may also control physical access to a document at any point in the scanning process. Secure scanning may be initiated manually by a user or initiated automatically based upon an identification or authentication of the user and/or one or more recipients of the scan data. The scanning device may also be configured to generate and provide status data to a user that indicates the current status of a scanning operation and/or the successful delivery of scan data to one or more recipients. The device may also be configured to determine the proximity of a user with respect to the device and use the proximity information to provide various notifications. For example, if the user leaves a specified proximity of the device before the scanning of a document is completed or before the document is retrieved from the device, then an appropriate notification may be provided to the user. This scanning device provides secure scanning of documents with status reporting and proximity detection. The device reduces the likelihood that an unauthorized third party can obtain documents being scanned. It is also more convenient for users because they do not have to remain at a scanning device until the scanning is complete to retrieve the documents. Thus, a user's workflow is greatly improved by the scanning device disclosed herein.

According to another aspect of the invention, a device includes a scanning mechanism and a security mechanism. The scanning mechanism is configured to scan a document and generate scan data that reflects the document. The security mechanism is configured to control physical access to the document.

BRIEF DESCRIPTION OF THE DRAWINGS

In the figures of the accompanying drawings like reference numerals refer to similar elements.

FIG. 1 is a block diagram that depicts an example arrangement in which secure scanning may be implemented, according to an embodiment of the invention.

FIG. 2 is a block diagram that depicts an example embodiment of a scanning device.

FIG. 3 is a flow diagram that depicts using secure scanning with scanning device 112 according to one embodiment of the invention.

FIG. 4 is a flow diagram that depicts using secure scanning with scanning device 112 according to one embodiment of the invention.

DETAILED DESCRIPTION

Figure 5B:
FIG. 5B is a block diagram that depicts example delivery status data according to an embodiment of the invention.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. SECURE SCANNING ARCHITECTURE
III. SECURE SCANNING OF DOCUMENTS
IV. SECURE SCANNING BASED UPON USER OR RECIPIENT
V. STATUS UPDATES AND NOTIFICATION MECHANISMS
VI. PROXIMITY DETECTION
VII. IMPLEMENTATION MECHANISMS

I. OVERVIEW

A scanning device includes a mechanism and/or process for scanning a document and generating scan data that reflects the document. As used herein, the term "document" refers to any printed document, photograph, handwritten document or any other media that is capable of being scanned. The scanning device is configured with a secure scanning mode of operation. When operating in the secure scanning mode, the scanning device may securely transmit scan data to one or more recipients. For example, the scanning device may encrypt scan data and/or transmit scan data to one or more recipients over one or more secure communications links. When operating in the secure scanning mode, the scanning device may also control physical access to a document, either during scanning, after scanning, any combination thereof, or during the entire process from the time a document is loaded into the scanning device for scanning. Secure scanning may be initiated manually by a user or initiated automatically based upon an identification of the user and/or the identification of one or more recipients of the scan data. User authentication may also be used to determine whether secure scanning is to be used. The scanning device may also be configured to generate and provide status data to a user that indicates the current status of a scanning operation and/or the successful delivery of scan data to one or more recipients. The device may also be configured to determine the proximity of a user with respect to the device and use the proximity information to provide various notifications. For example, if the user leaves a specified proximity of the device before the scanning of a document is completed or before the document is retrieved from the device, then an appropriate notification may be provided to the user. This scanning device provides secure scanning of documents with status reporting and proximity detection. The device reduces the likelihood that an unauthorized third party can obtain documents being scanned It is also more convenient for users because they do not have to remain at a scanning device until the scanning is complete to retrieve the documents. Thus, a user's workflow is greatly improved by the scanning device disclosed herein.

II. SECURE SCANNING ARCHITECTURE

FIG. 1 is a block diagram that depicts an example arrangement 100 in which secure scanning may be implemented, according to an embodiment of the invention. Arrangement 100 includes a personal computer (PC) (e.g., a desktop, laptop or workstation) 102, a personal digital assistant (PDA) 104, a mobile device 106, e.g., a cellular telephony or other wireless device, a server 108 and a client device 110, that are communicatively coupled to a scanning device 112 and an authorization server 114 via a network 116. Network 116 may be implemented by any medium or mechanism that provides for the exchange of data between the various elements depicts in FIG. 1. Examples of network 116 include, without limitation, a network such as a Local Area Network (LAN), Wide Area Network (WAN), Ethernet or the Internet, or one or more terrestrial, satellite or wireless links. Network 116 may also provide for secure communications between the various elements depicted in FIG. 1. The various elements depicted in FIG. 1 may also communicate via one or more direct communications links that are not depicted in FIG. 1 or described herein for purposes of brevity. Scanning device 112 may be any device capable of scanning documents and the invention is not limited to any particular type of scanning device. Examples of scanning device 112 include, without limitation, scanners, facsimile machines, copiers and MFPs.

FIG. 2 is a block diagram that depicts an example embodiment of scanning device 112. In this example, scanning device 112 includes a user interface 200, a communications interface 202, a scanning mechanism 204, scanning and other processes 206, a security mechanism 208, a proximity detector 210 and local storage 212. Scanning device 112 may include any number of other elements and processes, depending upon a particular implementation, and the approach described herein is not limited to any particular elements and processes.

User interface 200 may be implemented by any mechanisms and/or processes that allow for the exchange of information between scanning device 112 and users. Examples of user interface 200 include, without limitation, a display, such as a cathode ray tube (CRT) or liquid crystal display (LCD), and an input device, such as a keypad, touchpad, touch screen, keyboard or mouse, or any combination of displays and input devices. Communications interface 202 may be implemented by any mechanism that participates in the exchange of data between scanning device 112 and other elements over network 116. One non-limiting example of communications interface 202 is a wired or wireless network interface card.

Scanning mechanism 204 may be implemented by any mechanism capable of scanning documents and in combination with scanning and other processes 206, generate scan data. Security mechanism 208 may be implemented by any mechanism that provides secure storage of documents during any portion of the scanning process. This may include secure storage of documents prior to scanning, during scanning, after scanning, or all of scanning, as described in more detail hereinafter.

Proximity detector 210 may be implemented by any mechanism for determining the proximity of a user with respect to scanning device 112. Examples of proximity detector 210 include, without limitation, a motion detector and a radio frequency identification (RFID) detector.

Local storage 212 may be implemented by any type of storage. Examples of local storage 212 include, without limitation, volatile memory, such as random access memory (RAM) and non-volatile storage, such as one or more disks or flash memory. In the present example, local storage 212 stores user authorization data 214, scan data 216, status data 218 and address book data 220, all of which are described in more detail hereinafter. User authorization data 214, scan data 216, status data 218 and address book data 220 may be stored in local storage 212 in any format. It is optional for user authorization data 214, scan data 216, status data 218 and address book data 220 to be stored on local storage 212. As described in more detail hereinafter, status data 218 may be displayed to a user via the user interface 200 at scanning device 112. Status data 218 may also be transmitted to other locations via network 116. In both situations, it is optional for status data 218 to be stored on local storage 212. Address book data 220 may contain recipient display names, such as RECIPIENT1, and the corresponding address, such as an email address or address of a shared folder. The use of address book data 220 is described in more detail hereinafter. User authorization data 214 and scan data 216 may be stored in local storage 212 in a secure form, for example via encryption. Scanning device 112 may include other mechanisms, modules, processes, etc., depending upon a particular implementation, that are not depicted in FIG. 2 or described herein for purposes of explanation.

III. SECURE SCANNING OF DOCUMENTS

As previously described herein, when operating in the secure scanning mode, the scanning device 112 may control physical access to a document, either during scanning, after scanning, any combination thereof, or during the entire process from the time a document is loaded into the scanning device 112 for scanning. This may include maintaining a document in a secure manner so that only authorized personnel may access the document. According to one embodiment of the invention, secure storage is provided by security mechanism 208. Security mechanism 208 may be implemented using a wide variety of mechanisms and the invention is not limited to any particular type of mechanism. For example, security mechanism 208 may be connected to an automatic document feeder (ADF) or flatbed on scanning device 112. A mechanism may be included in scanning device 112 to move scanned documents from the ADF or the flatbed to security mechanism 208 after they have been scanned. The mechanism may include any combination of equipment, such as trays, feeders and belts and computer hardware and software. Examples of security mechanism 208 include, without limitation, a locking paper tray or feeder, a locking input or output bin, or a secure stack. Security mechanism 208 may also be configured to maintain multiple scanned documents separately to aid in retrieval. For example, security mechanism 208 may include multiple slots or separators to keep scanned documents separate to simplify document retrieval. Access to security mechanism 208 may be controlled, for example, through the use of a physical lock opened by a key or a lock opened by a user entering a code into a keypad on user interface 200. For example, scanning device 112 may be configured with a secure document loader mechanism having an access slot that prevents retrieval once a document has been submitted to scanning device 112 for scanning. After the document is scanned, it is then stored in a locked output bin that is accessible through the user interface 200 by entering an access code, or a physical key, depending upon a particular implementation.

Secure scanning may be used for all documents that are scanned or used selectively on particular documents. For example, a user may activate secure scanning using a button or selector on user interface 200. Once secure scanning has been selected in this manner, scanning device 112 may be configured to use secure scanning for all documents until secure scanning is de-selected by the user. This allows a user to select secure scanning and then scan any number of documents using secure scanning without having to separately select secure scanning for each document. Scanning device 112 may be configured to automatically de-select secure scanning after a specified amount of time with no activity. For example, if 30 seconds elapses with no documents being scanned, then scanning device 112 automatically de-selects secure scanning to return to the default mode of operation.

FIG. 3 is a flow diagram 300 that depicts using secure scanning with scanning device 112 according to one embodiment of the invention. In step 302, a user initiates scanning of a document. As described herein, a user may select normal or secure scanning via user interface 200. Alternatively, the user may deposit a document into a designated secure scanning input, such as a secure scanning input tray. In this situation, the user does not have to specifically designate secure scanning. The user may also select other properties of scanning, for example, the desired resolution, format and one or more recipients of the scan data. A user may specify the recipients of scan data by selecting names or entering email addresses of recipients using user interface 200. For example, scanning device 112 may be configured with the names of frequently used recipients and their corresponding email addresses. Scanning device 112 displays the names of the recipients on user interface 200. A user may select one or more of the names to receive scan data. Alternatively, a user may manually enter the email addresses of recipients on user interface 200.

In step 304, a determination is made whether secure scanning is to be used. For example, scanning device 112 may determine whether the user has selected normal or secure scanning and if no selection has been made, use the default mode, which may be either normal or secure scanning. As described above, scanning device 112 may also detect that a document has been inserted into a secure input bin or tray.

In step 306, the document is scanned using normal or secure scanning and scan data is generated. In step 308, the scan data 216 is transmitted to one or more recipients designated by the user. Scanning device 112 may perform a lookup in address book data 220 to determine the address of a recipient that was designated by a user by name. For example, suppose a user selected a recipient RECIPIENT1 via user interface 200. After the scan data 216 is generated, scanning device 112 refers to address book data 220 to determine the address of RECIPIENT1 and then transmits the scan data 216 to that address. Scan data 216 may be transmitted to recipients in encrypted form and/or transmitted over a secure communications link. For example, scan data 216 may be transmitted to a secure folder on server 108.

In step 310, additional documents are scanned using the same scanning mode or scanning device 112 is reset to the default scan mode. As described herein, a timer may be used to determine when scanning device 112 is to return to the default scan mode. For example, suppose the timer is set for 30 seconds. When scanning of a document is completed the timer is started. If any activity, such as scanning, occurs before 30 seconds elapses, then the same settings are used. If no activity occurs within 30 seconds, then scanning device 112 may automatically return to the default scan mode, which may be normal or secure scanning. Note that the types of activity that are monitored may vary depending upon a particular implementation. For example, on an MFP, activity may include other functions, such as printing, copying, faxing, etc. Thus, the occurrence of any of these activities may cause the current scanning mode to be used for the next document, under the assumption that the same user is using the MFP. Activities may also include a user interacting with user interface 200.

IV. SECURE SCANNING BASED UPON USER OR RECIPIENT

According to one embodiment of the invention, secure scanning may be selected based upon the identity of the user scanning a document. The identity of the user who is scanning a document may be determined using a wide variety of techniques and the invention is not limited to any particular technique. For example, a user may enter user credentials, such as a user ID and/or a password, into scanning device 112 via user interface 200. As another example, scanning device 112 may determine a user's identity from an identification card or smartcard via a card reader or scanner. As yet another example, scanning device 112 may be configured with an RFID scanner that reads the user's identification information from an RFID tag. The RFID tag may be embedded in a user's identification card or badge, or anywhere on the user's body, and when the user is within range of the RFID scanner, the user's identification data is automatically read from the RFID tag. Scanning device 112 may be configured to query a user for their identification if it cannot otherwise be determined. For example, scanning device 112 may be configured to require a user to enter identification information prior to allowing the user to scan a document if scanning device 112 does not know the identity of the user. Scanning device 112 may also be configured to authenticate a user, for example, by verifying user credentials, such as a user ID and password.

Once the identity of a user is known, scanning device 112 may determine whether to perform secure scanning based upon the user's identify. For example, scanning device 112 may default to using secure scanning for employees at a certain level or higher within corporations, such as officers, or for other employees who often handle confidential documents. Scanning device 112 may be configured to consult user authorization data 214 to make this determination. For example, suppose that a particular user enters their user ID via user interface 200. Scanning device 112 consults user authorization data 214 to determine whether secure scanning should be used for the particular user. This may be determined, for example, by performing a lookup based upon identification data for the user. If so, then secure scanning is used. In this situation, secure scanning may be used as a default that the user can override, for example via controls provided on user interface 200. The user authorization data 214 may be generated based upon a policy for a particular organization or application. In addition to using user identification and/or user authentication to determine whether secure scanning should be used, for example as a default, user identification and/or user authentication may also be used to determine whether a particular user is allowed to use secure scanning.

Scanning device 112 may also be configured to use authorization server 114 to determine whether to use secure scanning. For example, scanning device 112 may be configured to transmit the credentials of a particular user to authorization server 114 over network 116. Authorization server 114 returns information that scanning device 112 uses to determine whether to use secure scanning. For example, authorization server 114 may return data that directly indicates whether secure scanning should be used for the particular user. As another example, authorization server 114 may return data that scanning device 112 processes to determine whether to use secure scanning. For example, authorization server 114 may return data that indicates a user's level within a corporation. Scanning device 112 may then consult user authorization data 214 to determine whether to use secure scanning for this particular user based upon their level with the corporation.

According to one embodiment of the invention, the determination whether to use secure scanning may also be based upon the recipient(s) of a scanned document. As previously described herein, when a user scans a document on scanning device 112, the user may select one or more recipients of the scan data 216. According to one embodiment of the invention, scanning device 112 is configured to default to secure scanning if secure scanning is indicated for any of the recipients. Secure scanning may be indicated for a recipient if the recipient is at or above a specified level within an organization. For example, secure scanning may be used for all scanned documents sent to a particular executive of an organization. Scanning device 112 may be configured to reference user authorization data 214 to determine whether secure scanning should be used based upon one or more specified recipients. Scanning device 112 may also be configured to access authorization server 114 for this purpose. For example, after a user indicates an intended recipient of a scanned document, scanning device 112 may generate and transmit recipient identification data to authorization server 114. Authorization server 114 returns data to scanning device 112 indicating whether secure scanning should be used for the one or more recipients specified by the recipient identification data. Secure scanning based upon a recipient may be performed independent of or in combination with secure scanning based upon the identity of a user. For example, secure scanning may be used for specified combinations of users and recipients. The use of secure scanning may also be based upon whether a specified recipient is authorized for secure scanning. For example, suppose a user manually selects secure scanning and identifies a particular recipient. Scanning device 112 may determine whether secure scanning may be used with the particular recipient, for example, by consulting user authentication data 214 or authorization server 114.

FIG. 4 is a flow diagram 400 that depicts using secure scanning with scanning device 112 according to one embodiment of the invention. In step 402, a user initiates scanning of a document. As described herein, a user may select normal or secure scanning via user interface 200. For purposes of explaining this example, it is presumed that the user does not manually select secure scanning. In step 404, the identity of the user and/or the recipients is determined, for example, as previously described herein. In step 406, a determination is made whether secure scanning is to be used based upon the identity of the user, the one or more selected recipient, or both the identify of the user and the one or more selected recipients. In step 408, the document is scanned using normal or secure scanning and scan data is generated. In step 410, the scan data 216 is transmitted to one or more recipients designated by the user. This may include the use of address book data 220 as previously described herein to determine the address of recipients designated by the user. In step 412, additional documents are scanned using the same scanning mode or scanning device 112 may be reset to the default scan mode.

V. STATUS UPDATES AND NOTIFICATION MECHANISMS

Scanning device 112 may be configured to generate and provide various types of status information pertaining to the scanning of documents at scanning device 112. According to one embodiment of the invention, scanning device 112 is configured to generate status data 218 that indicates the status of scanning at scanning device 112. Status data 218 may indicate, for example, a percentage or number of pages of a document that have been scanned and whether scanning has been completed. Status data 218 may also indicate whether scan data has been successfully delivered to the specified recipients. For example, suppose that a user scans a document and indicates that the scan data 216 is to be delivered to recipients A and B. Scanning device 112 may periodically generate and provide status data 218 to the user indicating the status of the scanning process as the document is being scanned. Scanning device 112 may also generate and provide to the user status data 218 indicating whether the scan data 216 has been successfully delivered to recipients A and B. This may include, for example, information about any errors that occur as well as information confirming successful delivery to the intended recipients of the scan data 216. Any number and types of notifications may be provided to a user. For example, a notification may indicate the status of delivery to one recipient or multiple recipients.

Status data 218 may be provided to a user in a wide variety of ways, depending upon a particular implementation. Status data 218 may be stored at scanning device 112 and displayed to a user via user interface 200. For example, one or more messages may be displayed on a display screen of user interface 200. A user may also access scanning device 112 at a later time and retrieve status data 218. As another example, status data 218 may be transmitted to a client device over a communications link. This may include, for example, scanning device 112 transmitting status data 218, via network 116, to a user's PC 102, PDA 104, mobile device 106 or client device 110. The status data 218 may be transmitted to user devices in a variety of forms and formats, depending upon a particular implementation. For example, scanning device 112 may send status data 218 to a user in the form of an email or other notification. As another example, scanning device 112 may send status data 218 to a user as a text message or even as a telephone message. Various other forms may be used, depending upon a particular implementation, and the secure scanning approach described herein is not limited to any particular form, type or format of notifications. Secure scanning allows a user to select secure scanning, initiate scanning of a document and leave the proximity of scanning device 112 without worrying about the security of the document. This is particularly useful in situations where the scanning of a document will take a significant amount of time. It is also beneficial in situations where scanning device 112 performs post-scanning processing of scan data 216 that requires a significant amount of time. Such processing may delay the delivery of scan data 216 to recipients and the remote notification options avoid a user having to wait at scanning device 112 for scan data 216 to be delivered. The document that was scanned is maintained throughout the scanning process in a secure manner at scanning device 112. Furthermore, the user will receive a notification when the scanning and/or delivery of the scan data to the specified recipients is complete. The user can then return to scanning device 112 to retrieve the scanned document when it is convenient for the user. Instead of being sent immediately, a notification may also be sent after a specified amount of time has elapsed since scanning was complete. Scanning device 112 may also be configured to transmit status data 218 to server 108. This allows a user to later access server 108 and retrieve the status data 218 to determine whether a scan and delivery request has been complete. Status data 218 may also be provided to administrative personnel who can assist in diagnosing and correcting errors. For example, a status message may be sent to an administrator to indicate that there was an error delivering scan data to a recipient.

Scanning device 112 may also transmit data to user devices in a secure format, for example in an encrypted format. Thus, the status data 218 may be in any form or format and provided to the user using a wide variety of delivery mechanisms, depending upon a particular implementation, and the invention is not limited to any particular form, format or delivery mechanism. According to one embodiment of the invention, a user may specify a desired delivery mechanism via user interface 200. For example, after selecting secure scanning, a user may be presented on user interface 200 with a set of status data notification options. The user may select the desired notification option. For example, a user may select local notification only via user interface 200. As another example, a user may select to receive status data notifications via email, text message or voice message, etc.

Figure 5A:
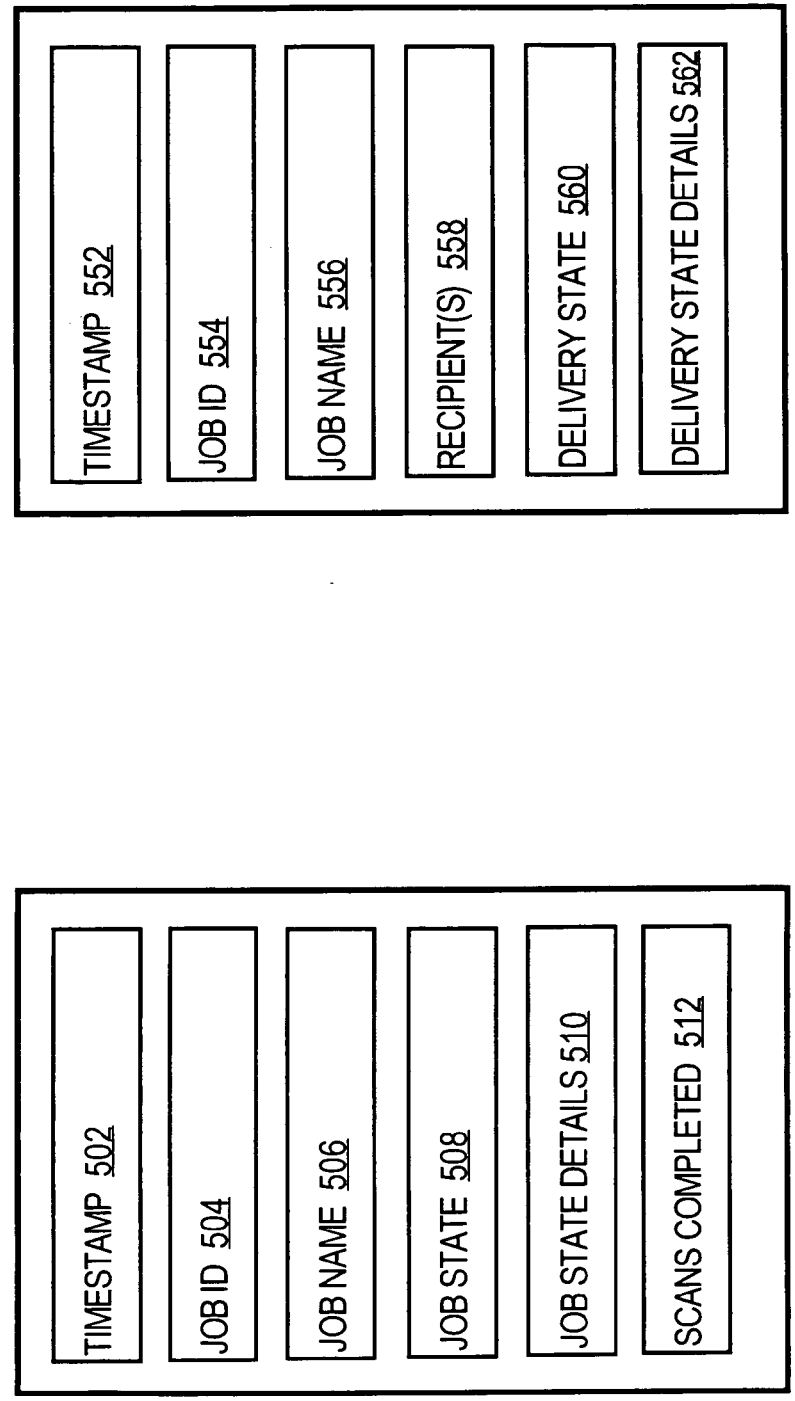
FIG. 5A is a block diagram that depicts example scan status data according to one embodiment of the invention.

FIG. 5A is a block diagram that depicts example scan status data 500 according to one embodiment of the invention. In this example, scan status data 500 includes a timestamp 502, a job ID 504, a job name 506, a job state 508. The job state 508 indicates a current state of the job, e.g., scanning, error, etc. Scan status data 500 also includes job state details 510 that indicate additional details about the job state, such as user intervention, scanner jammed, particular errors, etc. Scan status data 500 also includes scans completed 512. FIG. 5B is a block diagram that depicts example delivery status data 550 according to an embodiment of the invention. In this example, delivery status data 550 includes a timestamp 552, a job ID 554, a job name 556, recipient(s) 558, a delivery state 560 and delivery state details 562. The delivery state 560 generally indicates whether a delivery has been made to the recipient(s) indicated by the recipient(s) 558. For example, delivery state 560 may indicate a successful delivery or an error. The delivery state details 562 indicate details about the delivery, for example details about an errors that have occurred.

VI. PROXIMITY DETECTION

According to one embodiment of the invention, scanning device 112 is configured to determine the proximity of a user with respect to scanning device 112 and use this information to provide user notifications. The proximity of a user with respect to scanning device 112 may be determined using a wide variety of techniques, depending upon a particular implementation, and the invention is not limited to any particular approach. According to one embodiment of the invention, scanning device 112 uses proximity detector 210 to determine the proximity of a user with respect to scanning device 112. For example, in the context of proximity detector 210 being implemented as an RFID detector, proximity detector 210 can obtain identification information from a user with an RFID tag that is located within the scanning area of proximity detector 210.

According to one embodiment of the invention, scanning device 112 is configured to generate a notification if a user leaves a specified proximity of scanning device 112 before the scanning of a document requested by the user is complete. According to another embodiment of the invention, scanning device 112 is configured to generate a notification if a user leaves a specified proximity of scanning device 112 at any time before the scanned document has been retrieved from scanning device 112. For example, suppose that a user initiates scanning of a document and then walks away from the scanning device 112 before scanning is complete. In this situation, scanning device 112 generates a notification. Similarly, if the document has been scanned but not yet retrieved from scanning device 112 before the user leaves the proximity of scanning device 112, then scanning device 112 generates a notification.

The notification may be any type or form of notification. For example, a notification may include a visual indication on user interface 200. A notification may also include an audible notification, such as an alarm. A notification may also include data or a message transmitted to a device over network 116. For example, the notification may be in the form of an email transmitted to client device 110. As another example, the notification may be in the form of a text message or voice message transmitted to mobile device 106. Any type or form of notification may be used, depending upon a particular implementation. The content of a notification may also vary. For example, the notification may indicate details about a scan job, such as the current status, how much of the document has been scanned and when the scan was complete, if applicable.

VII. IMPLEMENTATION MECHANISMS

Figure 6:
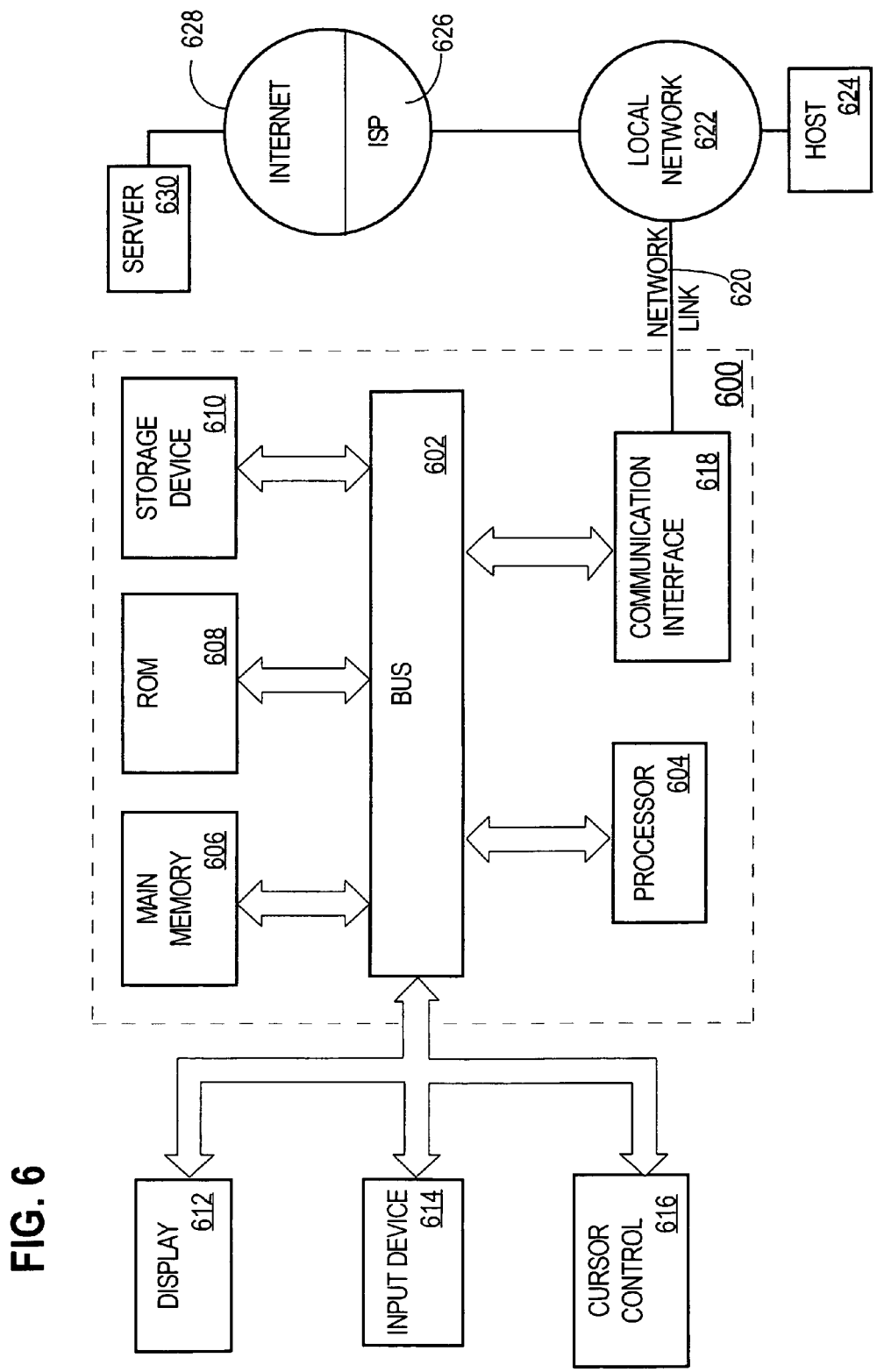
FIG. 6 is a block diagram of a computer system on which embodiments of the invention may be implemented.

The approach for performing secure scanning of documents described herein may be implemented on any type of computing architecture or platform and the invention is not limited to any particular computing architecture or platform. FIG. 6 is a block diagram that illustrates an example computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A device comprising:
 a scanning mechanism configured to scan an original, physical document and generate scan data that reflects the original, physical document; and
 a security mechanism configured to control physical access to the original, physical document that is scanned;
 wherein the security mechanism includes: a secure input bin for securely storing the original, physical document prior to and during scanning by the scanning mechanism; a security function for securely maintaining the original, physical document during scanning by the scanning mechanism; and a secure output bin for securely storing the original, physical document after being scanned by the scanning mechanism, wherein the scanning mechanism is further configured to:
 determine an identity of a user who requested scanning of the original, physical document;
 determine, based upon the identity of the user, whether the security mechanism is to be used; and
 if, based upon the identity of the user, the security mechanism is to be used, then causing the device to enter a secure scanning mode where the security mechanism is used by default to scan documents.

2. The device recited in claim 1, wherein the device is further configured to:
  encrypt the scan data to generate encrypted scan data; and
  transmit the encrypted scan data over a network to one or more recipient devices.

3. The device recited in claim 1, wherein the device is further configured to transmit the scan data to one or more recipient devices over a secure communications link.

4. The device recited in claim 1, wherein the device is configured to:
  generate status data that indicates the status of documents being scanned; and
  transmit the status data to a network device over a communications link.

5. The device recited in claim 4, wherein the device is configured to:
  generate status data that indicates whether the scan data was successfully delivered to one or more recipients; and
  transmit the status data to a network device over a communications link.

6. The device recited in claim 1, wherein the device is further configured to:
  establish one or more secure communications links with one or more recipient devices, and
  transmit the scan data that reflect the original, physical document to the one or more recipient devices over the one or more secure communications links.

7. A device comprising:
  a scanning mechanism configured to scan an original, physical document and generate scan data that reflects the original, physical document; and
  a security mechanism configured to control physical access to the original, physical document that is scanned;
  wherein the security mechanism includes: a secure input bin for securely storing the original, physical document prior to and during scanning by the scanning mechanism; a security function for securely maintaining the original, physical document during scanning by the scanning mechanism; and a secure output bin for securely storing the original, physical document after being scanned by the scanning mechanism, wherein the scanning mechanism is further configured to:
  determine one or more recipients that are selected by a user to receive the scan data, wherein the one or more recipients are different from the user;
  determine, based upon the one or more recipients, whether the security mechanism is to be used; and
  if, based upon the one or more recipients, the security mechanism is to be used, then causing the device to enter a secure scanning mode where the security mechanism is used by default to scan documents.

8. The device recited in claim 7, wherein the scanning mechanism is further configured to:
  determine whether all of the one or more recipients are authorized to use the security mechanism; and
  if all of the one or more recipients are authorized to use the security mechanism, then causing the device to enter the secure scanning mode.

9. A device comprising:
  a scanning mechanism configured to scan an original, physical document and generate scan data that reflects the original document; and
  a security mechanism configured to control physical access to the original, physical document that is scanned;
  wherein the security mechanism includes: a secure input bin for securely storing the original, physical document prior to and during scanning by the scanning mechanism; a security function for securely maintaining the original, physical document during scanning by the scanning mechanism; and a secure output bin for securely storing the original, physical document after being scanned by the scanning mechanism, wherein:
  the device further comprises a user proximity detection mechanism configured to determine a proximity of a user with respect to the device, and
  the device is further configured to generate a notification for the user if the user submitted a scanning job and a) a document that was scanned as part of the scan job has not yet been retrieved from the device and b) the user is no longer within a specified proximity of the device.

10. The device recited in claim 9, wherein the device is configured to generate the notification in the form of one or more of an email, a text message or a voice message.

11. The device recited in claim 9, wherein the proximity detection mechanism is a radio frequency identification (RFID)-based mechanism.

12. A device comprising:
  a scanning mechanism configured to scan an original, physical document and generate scan data that reflects the original document; and
  a security mechanism configured to control physical access to the original, physical document that is scanned;
  wherein the security mechanism includes: a secure input bin for securely storing the original, physical document prior to and during scanning by the scanning mechanism; a security function for securely maintaining the original, physical document during scanning by the scanning mechanism; and a secure output bin for securely storing the original, physical document after being scanned by the scanning mechanism, further comprising a user proximity detection mechanism configured to:
  determine a proximity of a user with respect to the device, and
  generate a notification for the user if a scanning job submitted by the user has not yet been completed and the user is not within a specified proximity of the device.

13. The device recited in claim 12, wherein the proximity detection mechanism is a radio frequency identification (RFID)-based mechanism.

* * * * *

UNITED STATES PATENT AND TRADEMARK OFFICE
CERTIFICATE OF CORRECTION

| | | |
|---|---|---|
| PATENT NO. | : 7,570,398 B2 | Page 1 of 1 |
| APPLICATION NO. | : 11/546056 | |
| DATED | : August 4, 2009 | |
| INVENTOR(S) | : Tian | |

It is certified that error appears in the above-identified patent and that said Letters Patent is hereby corrected as shown below:

Claim 5, column 13, line 17, "recited in claim 4, wherein" should read --recited in claim 1, wherein--

Signed and Sealed this

Eighth Day of September, 2009

David J. Kappos
*Director of the United States Patent and Trademark Office*